Patented Mar. 30, 1926.

1,578,494

UNITED STATES PATENT OFFICE.

PAUL ARTHUR WOLFF, OF ST. JOSEPH, MISSOURI.

PROTECTIVE COATING FOR BATTERY TERMINALS AND METHOD OF MAKING SAME.

No Drawing.  Application filed July 28, 1924.  Serial No. 728,643.

*To all whom it may concern:*

Be it known that I, PAUL ARTHUR WOLFF, a citizen of the United States, residing at St. Joseph, in the county of Buchanan and State of Missouri, have invented a certain new and useful Improvement in Protective Coatings for Battery Terminals and Methods of Making Same, of which the following is a specification.

My invention relates to improvements in protective coatings for battery terminals and methods of making same.

One of the objects of my invention is to provide a novel coating for battery terminals, which is easily made, is simple, cheap, which may be readily applied to battery terminals, and will protect them from acid action, which has great adhesiveness, and which will afford efficient protection during a maximum period of time.

My invention provides further a novel method for making my improved coating.

The novel features of my invention are hereinafter fully described and claimed.

In the preparation of my improved coating, substantial proportions of sixteen ounces of melted paraffin wax and one ounce of melted beeswax are mixed together, following which an alkali, preferably carbonate of soda in bicarbonate form, is added to the mixture to the extent of substantially four ounces. While the mixture is hot, it has added to it substantially one and one half ounces of glycerine.

Melted resin and paraffin oil are mixed together in the substantial proportions of two ounces of resin and one ounce of paraffin oil. If desired, to make the paraffin oil mixed with the resin, two ounces of vaseline may be mixed with the resin and the paraffin oil, but the addition of vaseline is not essential and may be omitted.

After the mixture above described, which contains the paraffin wax and beeswax has been permitted to cool, so as to partly harden, but while it is still pliable, the mixture of resin and paraffin oil is kneaded into the other mixture, which operation terminates the hardening action and gives the entire mass a paste-like consistency, which it afterwards retains.

The weights herein given are by avoirdupois measurement.

The paraffin wax affords a body coating; the beeswax affords a degree of hardness; the soda gives it an alkaline reaction; the glycerine affords an anti-freeze and reduces evaporation of moisture; the paraffin oil retains it in a pasty condition, so that it may be readily applied to battery posts or wherever it is to be used; and the resin renders the coating adhesive.

When the coating, so prepared, is applied to battery posts, the alkali contained in the coating will neutralize any acid that happens to be on the posts, and will afterwards neutralize any acid that might happen to accumulate on the posts so coated. The coating has great adhesiveness. It will not scale off from the posts, and is not easily rubbed off therefrom, and will protect the posts and the terminals to which it is applied for an extended period of time.

Many modifications of my invention may be made without departing from the spirit of my invention.

What I claim is:—

1. A protective coating for battery terminals comprising the following named elements in proportions substantially as follows:—paraffin wax sixteen ounces, beeswax one ounce, carbonate of soda four ounces, glycerine one and one half ounces, paraffin oil one ounce, and resin two ounces.

2. The method of making a protective coating for battery terminals consisting in first mixing together in proportions substantially as follows:—melted paraffin wax sixteen ounces, melted beeswax one ounce, carbonate of soda four ounces and glycerine one and one half ounces, permitting this mixture to harden to a thick pasty condition, and then mixing therewith a mixture of paraffin oil one ounce and melted resin two ounces.

In testimony whereof I have signed my name to this specification.

PAUL A. WOLFF.